Nov. 25, 1958　　　G. P. STRELAKOS　　　2,861,501
PORTABLE LIGHT REFLECTOR WITH MAGNIFYING GLASS
Filed July 9, 1954　　　　　　　　　　　　2 Sheets-Sheet 1

INVENTOR
George P. Strelakos
BY
Wooster & Davis
ATTORNEYS.

Nov. 25, 1958  G. P. STRELAKOS  2,861,501
PORTABLE LIGHT REFLECTOR WITH MAGNIFYING GLASS
Filed July 9, 1954  2 Sheets-Sheet 2
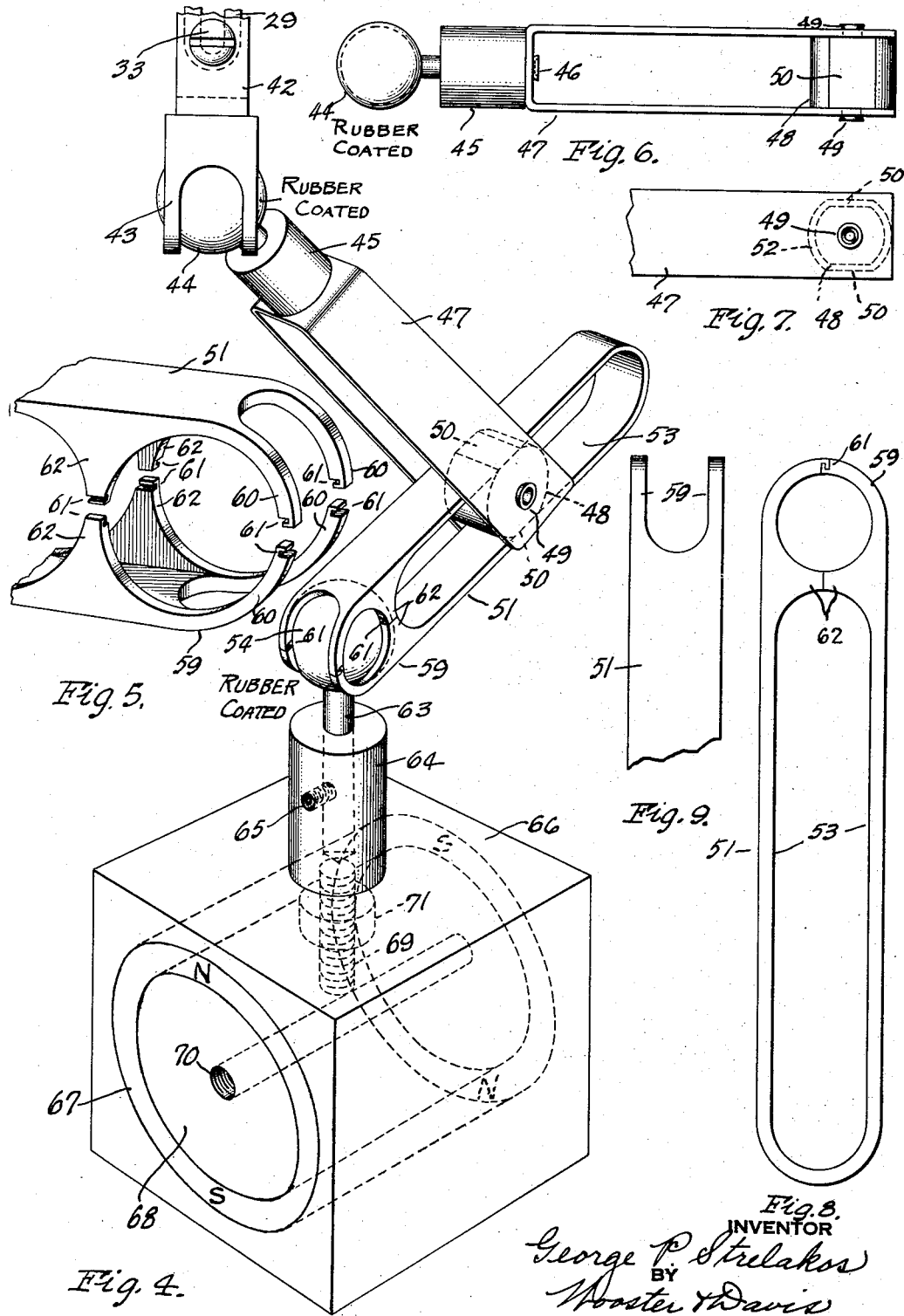
INVENTOR
George P. Strelakos
BY
Wooster & Davis
ATTORNEYS

2,861,501

PORTABLE LIGHT REFLECTOR WITH MAGNIFYING GLASS

George P. Strelakos, Stamford, Conn.

Application July 9, 1954, Serial No. 442,285

7 Claims. (Cl. 88—97)

This invention relates to a portable light and reflector for industrial use, particularly a light for use by machinists or toolmakers while working on various machine tools, such, for example, as lathes or the like, and has for an object to provide a reflector and illuminating means which may be easily and quickly located at different positions on the machine for most effectively illuminating the work on which the operator is working while he is performing the various operations.

Another object is to provide such a device which may be readily adjusted after mounting it on the machine to direct the light to any portion of the work desired and which will also have improved means for viewing the work so illuminated.

A still further object is to provide a device which will readily focus or direct a light beam in hard-to-get-at places or locations on the work, and which will eliminate the use of the usual bulky portable light and its annoying heat in close quarters, which is hung at various locations on the machine in an attempt to illuminate the work.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 4 is a perspective view of a modified form of support for the light and reflector;

Fig. 5 is a perspective view of a detail thereof;

Fig. 6 is a top plan view of one of the members of Fig. 4;

Fig. 7 is a side view of one end of the member of Fig. 6;

Fig. 8 is a side view of another member of Fig. 4, and

Fig. 9 is another side view of one end thereof.

Figure 2:
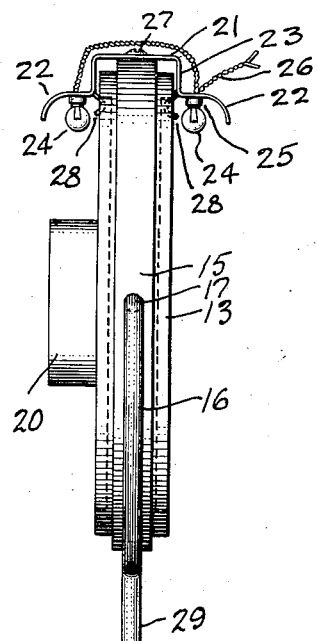
Fig. 2 is a partial edge view and partial section.

The device comprises a mirror 10, preferably a double-face mirror, which has a flat reflecting surface 11 on one side and concave reflecting surface 12 on the opposite side, so that the reflected light beam may be either a more spread-out beam to illuminate a larger surface when using the flat side 11, or the curved concave side may be used to concentrate or focus the beam on a relatively small spot or area. The mirror or reflector may be made of various materials, such, for example, as glass, metal, or coated plastic. The mirror is mounted in a circular frame 13 which has a peripheral groove or channel 14 in which is seated a ring 15, the frame 13 being capable of turning movement in the ring 15 about the center of the mirror so that the mirror may be turned to different positions for a purpose presently to be described. It will be retained by friction in the adjusted position, although clamping or other securing means could be used if desired. The ring 15 is mounted in a forked support 16 on the pivots 17 so that the mirror can also be swung to different angular positions.

Figure 1:
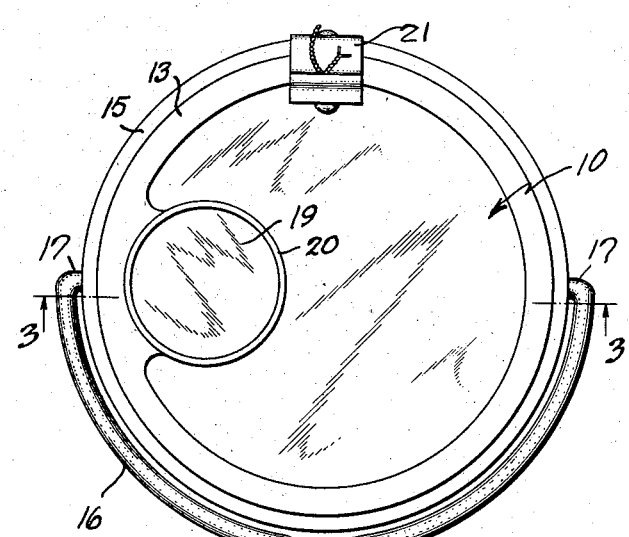
Fig. 1 is a partial side elevation and partial section of one form of the device.
Figure 1:
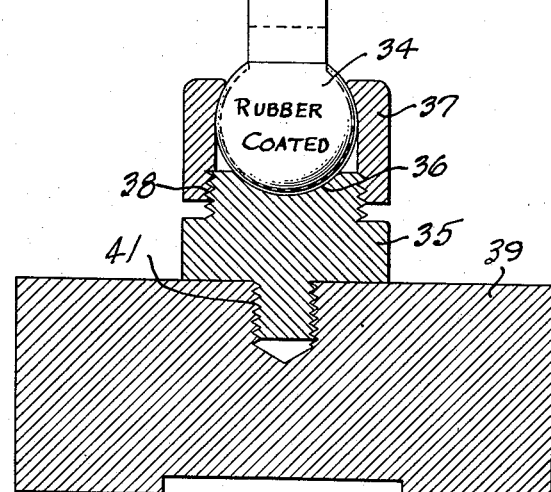

Spaced laterally from its center the mirror has a clear glass or transparent portion 18 with a magnifying glass or lens 19 over this clear portion, and the reason for mounting the mirror so that it may turn about its center in the ring 15 is to locate this magnifying glass or lens at different angular positions about the center of the mirror or reflector, or that is, at different points in the frame, as for example at the left side as shown in Fig. 1, or at the top, right or bottom as desired, depending on the location of the work to be examined. The lens may be mounted by any suitable means, but in the arrangement shown the frame 13 is provided with a circular tubular section or lateral extension 20 over the clear portion 18 of the mirror or reflector, in which the lens is mounted and may be secured by any suitable means, either a suitable clamp or by cementing it in the extension 20.

This mirror or reflector may be used as a reflector for reflecting light from any suitable light source to the portion of the work to be illuminated, or if desired there may be mounted on the supporting frame for the reflector a suitable light source as an electric bulb from which the light may be reflected by the reflector onto the work. In the arrangement shown there is a small bracket or support 21, including a generally U-shaped portion with overhanging extensions 22 at the free ends of the side legs 23, within each of which is mounted an electric light bulb 24 in any suitable socket 25 connected by a light cord 26 with any of the usual plug-in devices for plugging into an electric outlet. One of these light bulbs may be mounted on each side of the double-faced mirror for use with either side. It may be secured to the mirror frame by any suitable means, such for example as a screw 27 or spring clips 28 gripping under the overhanging rim of the frame, or both, so that it may be either permanently attached to the frame or readily detachable therefrom. The light bulbs are located so that the light therefrom may be reflected by the mirror surfaces onto the work.

Figure 3:
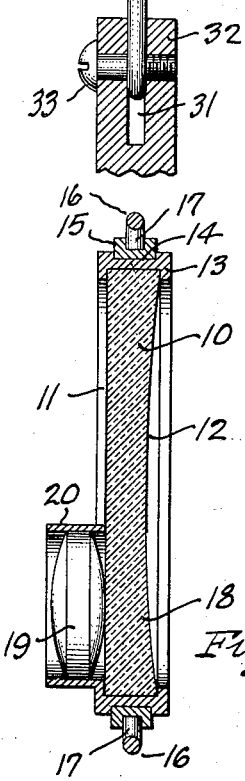
Fig. 3 is a transverse section substantially on line 3—3 of Fig. 1.

Two different forms of adjustable supports are shown for the mirror and light. In the form shown in Figs. 1 to 3, the forked support 16 includes an intermediate extension 29 comprising parallel side members forming a connecting loop 30 which is seated in a recess or notch 31 in the end of a support 32, and held therein by any suitable means, such as a screw 33, which will form a clamping pivotal connection which will permit the support 29 to be swung to different angles, but may be tightened to clamp it in different angular positions. The support 32 includes a ball 34 mounted in a suitable socket support 35 having a spherical seat 36, and in which the ball may be seated and held and clamped by a retaining sleeve 37 having screw thread connection 38 to the member 35. This could be a rubber coated ball to increase the grip. This provides a universal connection whereby the support 32 and the mirror and other parts carried thereby may be shifted in all directions, and then held in the adjusted position either by tightening up the sleeve 37 to clamp it in this position, or this sleeve may be adjusted to frictionally hold the mirror support in different angular positions, so that it may be shifted to these positions by merely applying lateral pressure to the support.

A suitable supporting base is provided for mounting and securing the mirror on any part of the machine with which it is being used. The preferred supporting base includes a permanent magnet. That shown at 39 is provided with exposed areas 40 of opposite polarity whereby it may be supported at any position on the machine by merely bringing it into contact with any part of the machine and it will firmly support itself in any position on the machine, together with the mirror or reflector and other parts associated therewith. The socket member 35 is connected to this base by any suitable means, such as the screw thread connection 41. Other types of supporting bases for securing the device to the machine may be used, such, for example, as clamps or suction cups, but a magnetic means is preferred as it is more reliable and no manipulation is required in attaching it to the machine. All that is necessary is to bring it into engagement with any part of the machine to which it is desired to attach the mirror or reflector and the associated parts.

In the form of Figs. 5 to 9 a somewhat more complicated form of support for the mirror and lens is provided whereby greater adjustment and universal movement is possible, particularly where light is desired at highly inaccessible locations or locations difficult to get at. In this form the mirror and its support 16 are the same as in Figs. 1, 2 and 3, and it is mounted on the support 42 by a screw 33. This support 42 corresponds to the support 32 of the first form, and has a forked end 43 tightly gripping a ball 44 for universal movement, which ball is preferably rubber covered or coated to give a better frictional grip. This fork 43 may be of the same construction as that shown at 59 on member 51. This ball 44 is mounted on a supporting member 45 which is riveted as indicated at 46 to the U-shaped support or link 47. This link 47 carries between its side arms at their free ends a transverse pin 48 pivoted at its opposite ends by reduced studs 49 riveted over in the side arms of the member 47, and this pin has flats 50 on its opposite sides slidable in the link 51, the pin being preferably rubber covered or coated as shown at 52, for a better frictional grip in the guideway 53 in the link and to hold the device in different adjusted positions. The half rivets 49 also form a tight, close pivot connection between the member 47 and the member 48 which will permit turning movements of the member 47 to different angular positions about the member 48 and to different angular positions on the link 51, but the pivots 49 being tight enough to retain the member 47 in these different angular positions. The free end of 51 can go through member 47 and therefore 47 can be swung to either side of member 51. One end of the link 51 is mounted for universal movement on the ball 54 which is also preferably rubber covered or coated for a better frictional grip with the end 59 of the member 51. This end is preferably forked as shown, the two side fingers 60 of the fork being substantially circular to grip the ball 54 and it is divided on a horizontal line, the opposite sides of this division being locked together by the interlocking hook members 61, there being also preferably provided similar fingers 62 on the opposite side of the ball and interlocked at their free ends by similar hooks 61 in the same manner. The same locking connection may be used for the fork 43 of the member 42.

The ball 54 is mounted on a pin 63 in a stud or member 64 in which the member 63 may be turned to different angular positions and secured by any suitable means, such as a socket set screw 65. The member 64 is mounted on a base block 66 which is preferably of rubber or other suitable nonmagnetic plastic molded in one piece about a tubular permanent magnet 67, and the center space or passage in this magnet may be also filled with this plastic, as shown at 68. The opposite ends of the tubular magnet are preferably exposed at the opposite side surfaces or ends of the block 66, and it is magnetized to have opposite poles at both of its ends, and each end has both north and south poles. Thus, for example, as shown, the left hand end shown in solid lines is preferably located with one pole, such, for example, as a north pole at the top, and an opposite or south pole at the bottom. The same arrangement would be used at the opposite end, except that the poles would be reversed with the south pole at the top and the north pole at the bottom, and this also provides opposite poles at the opposite ends at both the top and bottom of the magnet and the block 66. The block is tapped from the top wall to receive the threaded stud 69 of the support in member 64, and the plastic member 68, and also with tapped openings 70 from its opposite ends to receive the same stud 69 so that the member 64 may be mounted either on the side or the opposite ends of the block 66 as preferred, and also for use of the magnet either with its exposed ends in direct contact with the metal support of the machine on which it is used when supported on the opposite ends of the block 66, or spaced a slight distance from the metal support when the block 66 is supported on the side or bottom surface, as indicated in the drawing. A metal insert 71 may be used in the tapped opening, either in the top or in the end openings 70 if desired, to increase the strength of the threads in the plastic material for holding the stud 69.

All the joints of this support are friction joints requiring pressure to shift the elements connected together by this joint with respect to each other, and it will be seen that with the construction shown a relatively large amount of movement and adjustment may be given to the mirror 10 and the lens 19 as well as universal movement to practically any angle desired, and the mirror will be automatically retained in this position with respect to the supporting block 66 and thus in any position desired with respect to the work to be examined. The block 66 with the magnet 67 can be secured in any desired position on any metal part of the machine which includes iron or steel. Thus no clamps are required to secure the device in any desired position on the machine, it being merely necessary to place the block in any position desired, and it will be automatically retained there by the magnet. The members 42, 44, 57 and 64 could be of metal, or could be of suitable plastics if desired for lighter weight.

This device can be easily and quickly placed on any part of the machine tool with which the machinist or toolmaker is working, and it will be held effectively by the magnet without any clamping operation, and then the mirror or reflector can be adjusted to illuminate the work or any part or surface on it, even the inside of an opening or bore difficult to illuminate with ordinary means, and if desired, the magnifying glass or lens 19 may be shifted to give a magnified view of the portion illuminated. It will be apparent this will greatly facilitate the work of the machinist, toolmaker or other operator and make it much easier for him to do accurate work, and the device will, while effecting this improved illumination and permitting better examination of the work, do so while leaving both hands of the operator free for carrying out his operations. It is especially adapted for use by toolmakers, machinists, inspectors, precision mechanics and others who wish to effectively illuminate and examine any particular article or surface thereon.

Having thus set forth the nature of my invention, I claim:

1. An industrial portable light reflector comprising a mirror having exposed opposite sides each operable as a light reflector to direct a beam of light to work being processed in a machine, said mirror including a clear portion offset laterally from the center of the mirror, a magnifying lens over the clear portion in position to observe the area on which the light beam is directed, means mounting the mirror for turning movements about a center axis at right angles to the plane of the mirror to position the lens at different angular positions about the center of the mirror, a permanent magnetic means having exposed surface areas of opposite polarity whereby it may be supported on the machine, and a supporting means mounting the mirror and lens on the magnetic means for adjustment to different positions relative thereto including connected members one of which has a rubber covered ball with the rubber fixed to the ball and the other has a forked end gripping this ball.

2. An industrial portable light reflector comprising a mirror operable as a light reflector to direct a beam of light to work being processed in a machine, said mirror including a clear portion offset laterally from the center of the mirror, a magnifying lens over said clear portion in position to observe the area on which the light beam is directed, a permanent magnetic means having exposed surface areas of opposite polarity whereby it may be supported on the machine, a supporting means for the mirror including means whereby it may be turned in the plane of the mirror about its center axis at right angles to this plane to locate the lens at different angular positions about this center and spaced therefrom, and means mounting said mirror supporting means on the magnetic means for adjustment to different positions relative thereto.

3. An industrial portable light reflector comprising a mirror operable as a light reflector to direct a beam of light to work being processed in a machine, said mirror including a clear portion offset laterally from the center of the mirror, a magnifying lens over said clear portion in position to observe the area on which the light beam is directed, means mounting the mirror for turning movements about its center axis at right angles to the plane of the mirror to locate the lens at different angular positions about this center, a supporting base including means whereby it may be secured to the machine, and a supporting means mounting the mirror and lens on said base including means whereby the mirror and lens may be adjusted to different positions relative to said base.

4. An industrial portable light reflector comprising a mirror operable as a light reflector to direct a beam of light to work being processed in a machine, a magnifying lens mounted on the mirror offset laterally from the center of the mirror in position to observe the area on which the light beam is directed, a ring in which the mirror and lens is mounted, a second ring, cooperating guide means on the rings mounting the mirror for turning movements about the center of the mirror in the plane of the mirror to locate the lens in different angular positions about said center and spaced therefrom, a support in which the mirror is pivotally mounted for lateral swinging movements, a supporting base including means whereby it may be secured to the machine, and means mounting said support on the base for universal adjustment of the mirror relative to said base.

5. An industrial portable light reflector comprising a mirror operable as a light reflector to direct a beam of light to work being processed in a machine, a magnifying lens mounted on the mirror offset laterally from the center of the mirror in position to observe the area on which the light beam is directed, a ring in which the mirror and lens is mounted for turning movements about the center of the mirror on an axis at right angles to the plane of the mirror to locate the lens in different angular positions about said center and spaced therefrom, a support in which the mirror is pivotally mounted for lateral swinging movements, a permanently magnetic means having exposed surface areas of opposite polarity whereby it may be supported on a machine, and supporting means mounting said support on the magnetic means including a universal connection comprising connected members one of which has a ball with a fixed rubber coating on its surface and the other has a forked end gripping this ball permitting universal adjustment of the mirror and lens relative to said magnetic means.

6. An industrial portable light reflector to direct a beam of light to work being processed in a machine comprising a mirror, a supporting means for said mirror including a permanent magnet, a supporting member connected with the magnet including a rubber coated ball, a link member having a forked end frictionally gripping the ball and including a body portion provided with a longitudinal guide slot, a second link including a forked body, a rubber coated pin having flattened sides frictionally slidable in said guide slot, a pivot means connecting the second link to said pin having sufficient friction to retain the link in different angular positions about said pin, and adjustable means mounting the mirror on said second link.

7. An industrial portable light reflector to direct a beam of light to the work being processed in a machine comprising a mirror, a supporting means for said mirror comprising a base member including means whereby it may be secured to the machine, a first link comprising an elongated body having a longitudinal guide slot and a forked end, a member secured to said base provided with a rubber coated ball frictionally gripped by said forked end, a second link including an elongated forked body, a rubber coated pin between the sides of said forked body and having flattened sides frictionally slidable in said guide slot, means pivotally securing the second link to said pin having sufficient friction to hold said link in different angular positions with respect to the first link, a rubber coated ball mounted on the second link, and a mounting means for the mirror including a member having means frictionally gripping said latter ball for substantially universal angular adjustment thereon.

References Cited in the file of this patent

UNITED STATES PATENTS

| Number | Name | Date |
|---|---|---|
| 354,976 | Field | Dec. 28, 1886 |
| 544,300 | Hanlon | Aug. 13, 1895 |
| 679,044 | Zeng | July 23, 1901 |
| 775,003 | Eustis | Nov. 15, 1904 |
| 947,751 | Long et al. | Jan. 25, 1910 |
| 1,071,725 | Franks | Sept. 2, 1913 |
| 1,175,274 | Klorer | Mar. 14, 1916 |
| 1,624,741 | Leppke et al. | Apr. 12, 1927 |
| 1,641,880 | Cohen | Sept. 6, 1927 |
| 1,657,334 | Adams | Jan. 24, 1928 |
| 1,873,943 | Ritz-Woller | Aug. 23, 1932 |
| 1,932,143 | Piercy | Oct. 24, 1933 |
| 1,976,258 | Hollingsworth | Oct. 9, 1934 |
| 2,114,767 | La Hodny et al. | Apr. 19, 1938 |
| 2,249,454 | Brake | July 15, 1941 |
| 2,563,473 | Levinson | Aug. 7, 1951 |
| 2,613,104 | Parsons | Oct. 7, 1952 |